United States Patent
Son (10) Patent No.: US 11,454,481 B2
(45) Date of Patent: *Sep. 27, 2022

(54) METHOD AND SYSTEMS FOR BALLISTICS IMAGING AND COMPARISON

(71) Applicant: VAAS INTERNATIONAL HOLDINGS, INC., Chicago, IL (US)

(72) Inventor: Dinh Tien Son, Tphcm (VN)

(73) Assignee: VAAS INTERNATIONAL HOLDINGS, INC., Chicago, IL (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/884,186

(22) Filed: May 27, 2020

(65) Prior Publication Data

US 2021/0278185 A1  Sep. 9, 2021

Related U.S. Application Data

(63) Continuation of application No. 15/933,287, filed on Mar. 22, 2018, now Pat. No. 10,782,110.

(51) Int. Cl.
  *F42B 35/00* (2006.01)
  *G02B 21/18* (2006.01)
  *G06T 7/00* (2017.01)

(52) U.S. Cl.
  CPC .............. *F42B 35/00* (2013.01); *G02B 21/18* (2013.01); *G06T 7/0004* (2013.01)

(58) Field of Classification Search
  CPC ........ F42B 35/00; G02B 21/18; G06T 7/0004
  See application file for complete search history.

(56) References Cited

U.S. PATENT DOCUMENTS

| | | | | |
|---|---|---|---|---|
| 5,390,108 A | * | 2/1995 | Baldur | G06T 7/30 705/28 |
| 5,633,717 A | * | 5/1997 | Baldur | G01B 11/026 356/615 |
| 5,654,801 A | * | 8/1997 | Baldur | F42B 35/00 359/387 |
| 6,154,562 A | * | 11/2000 | Baldur | G02B 21/00 382/141 |
| 6,327,032 B1 | * | 12/2001 | Lajeunesse | G02B 21/082 356/394 |
| 7,822,263 B1 | * | 10/2010 | Prokoski | F42B 35/00 382/152 |

(Continued)

*Primary Examiner* — Fayyaz Alam (57) ABSTRACT

Methods and systems for collecting high definition images of spent firearm cartridges under different illumination conditions described herein. Features indicative of firing pin impact with each spent firearm cartridge are extracted and compared to features extracted from different spent firearm cartridges. The likelihood that the cartridges were fired from the same firearm is determined based on the differences between the extracted features. A cartridge fixture locates a spent firearm cartridge inside an imaging chamber illuminated by different combinations of illumination devices located in different locations with respect to the spent firearm cartridge. Collected images are filtered by a trained image feature filter to extract features indicative of a firing pin strike. Features extracted from different spent firearm cartridges are compared to determine the likelihood that the spent firearm cartridges were fired from the same firearm based on one or more error metrics characterizing feature differences.

20 Claims, 10 Drawing Sheets

(56) References Cited

U.S. PATENT DOCUMENTS

| | | | |
|---|---|---|---|
| 8,755,588 B2* | 6/2014 | Leloglu | G06T 7/12 |
| | | | 382/141 |
| 2004/0027630 A1* | 2/2004 | Lizotte | G02B 26/101 |
| | | | 359/15 |
| 2004/0217159 A1* | 11/2004 | Belanger | F42B 35/00 |
| | | | 235/375 |
| 2017/0146319 A1* | 5/2017 | Lyren | G06T 17/00 |

* cited by examiner

| | | MEMORY 135 | | | |
|---|---|---|---|---|---|
| | | INCIDENT INFO | | | |
| ID | CALIBER | LOCATION | TIME | IMAGES | FEATURE VECTOR |
| A1 | 9MM | 27.657912, -92.579146 | 03/12/2010, 23:14 | P11.IMG P12.IMG ⋮ P1J.IMG  }171 | $V_1$ |
| A2 | 9MM | 27.557257, -92.438514 | 03/13/2010, 21:36 | P21.IMG P22.IMG ⋮ P2J.IMG  }172 | $V_2$ |
| ⋮ | ⋮ | ⋮ | ⋮ | ⋮ | |
| AN | 9MM | 27.657911, -92.579145 | 03/14/2010, 23:14 | PN1.IMG PN2.IMG ⋮ PNJ.IMG  }173 | $V_N$ |

FIG. 4

| MEMORY 135 | | | | | | | |
|---|---|---|---|---|---|---|---|
| PROBE | | CANDIDATE | | ERROR METRIC 1 | ... | ERROR METRIC M | AGGREGATE ERROR VALUE |
| ID | FV | ID | FV | | | | |
| A1 | $V_1$ | A2 | $V_2$ | $^1E_{12}$ | ... | $^ME_{12}$ | $^{AGG}E_{12}$ |
| | | A3 | $V_3$ | $^1E_{13}$ | ... | $^ME_{13}$ | $^{AGG}E_{13}$ |
| | | A4 | $V_4$ | $^1E_{14}$ | ... | $^ME_{14}$ | $^{AGG}E_{14}$ |
| | | ⋮ | ⋮ | ⋮ | | ⋮ | ⋮ |
| | | AN | $V_N$ | $^1E_{1N}$ | ... | $^ME_{1N}$ | $^{AGG}E_{1N}$ |
| A2 | $V_2$ | A1 | $V_1$ | $^1E_{21}$ | ... | $^ME_{21}$ | $^{AGG}E_{21}$ |
| | | A3 | $V_3$ | $^1E_{23}$ | ... | $^ME_{23}$ | $^{AGG}E_{23}$ |
| | | A4 | $V_4$ | $^1E_{24}$ | ... | $^ME_{24}$ | $^{AGG}E_{24}$ |
| | | ⋮ | ⋮ | ⋮ | | ⋮ | ⋮ |
| | | AN | $V_N$ | $^1E_{2N}$ | ... | $^ME_{2N}$ | $^{AGG}E_{2N}$ |
| ⋮ | ⋮ | ⋮ | ⋮ | ⋮ | | ⋮ | ⋮ |

```
┌─────────────────────────────────────────────────────────┐
│ PROVIDING A FIRST AMOUNT OF ILLUMINATION LIGHT TO A     │
│ CARTRIDGE BASE OF A SPENT FIREARM CARTRIDGE AT A FIRST  │──201
│ ILLUMINATION INSTANCE, THE FIRST AMOUNT OF LIGHT PROVIDED│
│ BY A FIRST COMBINATION OF A PLURALITY OF ILLUMINATION   │
│ DEVICES DISPOSED AT DIFFERENT LOCATIONS WITH RESPECT TO │
│                  THE CARTRIDGE BASE                     │
└─────────────────────────────────────────────────────────┘
                             │
                             ▼
┌─────────────────────────────────────────────────────────┐
│ PROVIDING A SECOND AMOUNT OF ILLUMINATION LIGHT TO THE  │
│ CARTRIDGE BASE AT A SECOND ILLUMINATION INSTANCE, THE   │──202
│ SECOND AMOUNT OF LIGHT PROVIDED BY A SECOND COMBINATION │
│         OF THE PLURALITY OF ILLUMINATION DEVICES        │
└─────────────────────────────────────────────────────────┘
                             │
                             ▼
┌─────────────────────────────────────────────────────────┐
│ CAPTURING ONE OR MORE IMAGES OF THE CARTRIDGE BASE IN   │
│ RESPONSE TO THE FIRST ILLUMINATION INSTANCE AND ONE OR  │──203
│ MORE IMAGES OF THE CARTRIDGE BASE IN RESPONSE TO THE    │
│            SECOND ILLUMINATION INSTANCE                 │
└─────────────────────────────────────────────────────────┘
                             │
                             ▼
┌─────────────────────────────────────────────────────────┐
│ STORING THE ONE OR MORE IMAGES OF THE CARTRIDGE BASE    │
│ CAPTURED AT EACH OF THE FIRST AND SECOND ILLUMINATION   │──204
│                     INSTANCES                           │
└─────────────────────────────────────────────────────────┘
                             │
                             ▼
┌─────────────────────────────────────────────────────────┐
│ LOCATING ONE OR MORE REGIONS OF IMPACT OF A STRIKE OF A │
│ FIRING PIN OF A FIRST FIREARM EMPLOYED TO DISCHARGE THE │
│ FIRST SPENT FIREARM CARTRIDGE WITHIN EACH OF THE ONE OR │──205
│ MORE IMAGES AT EACH OF THE FIRST AND SECOND ILLUMINATION│
│                     INSTANCES                           │
└─────────────────────────────────────────────────────────┘
                             │
                             ▼
┌─────────────────────────────────────────────────────────┐
│ DETERMINING A FIRST SET OF IMAGE FEATURES INDICATIVE OF │
│ THE IMPACT OF THE STRIKE OF THE FIRING PIN OF THE FIRST │──206
│ FIREARM FROM THE ONE OR MORE IMAGES AT BOTH THE FIRST   │
│             AND SECOND ILLUMINATION INSTANCES           │
└─────────────────────────────────────────────────────────┘
```

FIG. 11

METHOD AND SYSTEMS FOR BALLISTICS IMAGING AND COMPARISON

TECHNICAL FIELD

The described embodiments relate to systems and tools for imaging, analysis, and comparison of spent firearm cartridges.

BACKGROUND INFORMATION

A conventional, loaded centerfire firearm cartridge includes a cartridge case, a primer, propellant, and a projectile. The primer is fitted to the base of the cartridge, the propellant is contained within the case of the cartridge, and the projectile is fitted to the end of the cartridge case opposite the cartridge base. A loaded firearm cartridge is chambered in a firearm sized to match the loaded firearm cartridge. The firearm locates the loaded firearm cartridge in a barrel of the firearm and secures the cartridge in the barrel by locating a breech face against the cartridge base. The firearm responds to a trigger pull by mechanically propelling a firing pin through a small hole in the breech face causing the firing pin to collide with the primer fitted to the cartridge base. The collision causes a sharp indentation of the primer housing and ignites a small propellant charge contained within the primer. The ignition of the primer, in turn, ignites the propellant contained within the cartridge case. As the propellant burns, pressure builds within the cartridge case which causes the projectile to break away from the cartridge case, accelerate down the barrel, and exit the barrel of the firearm. At this point the spent firearm cartridge includes the cartridge case and the spent primer fitted to the base of the cartridge. The spent firearm cartridge is removed from the barrel of the firearm and discarded.

Spent firearm cartridges are of particular interest in crime scene analysis. Commonly, spent firearm cartridges are left behind at the crime scene, while the firearm(s) employed in the commission of the crime are not present at the crime scene. In many cases, spent firearm cartridges are one of the few pieces of physical evidence available to investigators at the scene of a crime. More importantly, spent firearm cartridges include physical markings from the firearm used to fire the spent firearm cartridge. In particular, the collision of the firing pin with the primer fitted to the cartridge base leaves a permanent mark on the primer face that is unique to the firing pin of the firearm employed to fire the spent cartridge. In addition, the surface of cartridge base, including the primer face is pressed against the breech face with large force when the cartridge is fired. In some instances, unique machine tool patterns or markings on the breech face are imprinted on the cartridge base and primer face. Thus, in many cases, the physical markings that remain on the cartridge base and primer face of a spent firearm cartridge offer a direct link to the firearm employed to fire the cartridge, effectively linking particular firearms with particular crimes.

Traditionally, analysis of spent firearm cartridges and linking spent firearm cartridges to particular firearms has been performed manually by human specialists. Trained human specialists are able to separate markings caused by the interaction of a spent firearm cartridge with a firearm from markings caused by other sources (e.g., manufacturing marks, handling marks, etc.). In addition, linking marks on spent firearm cartridges to a particular firearm often turns on very subtle details of the mark that are often not distinguishable by an untrained eye.

The United Stated Bureau of Alcohol, Tobacco, Firearms and Explosives (ATF) administers the National Integrated Ballistic Information Network (NIBIN) to store ballistics images acquired by an Integrated Ballistics Identification System (IBIS) manufactured by Forensic Technology WAI, Inc., Montreal, Canada. Topographical features of fired ammunition recovered from a crime scene or a gun known to have been used in a crime are acquired by the IBIS system and stored in a database. In response to a query, images associated with a new acquisition are compared against images associated with prior acquisitions stored in the database. If likely matches emerge, human specialists analyze original evidence to confirm a match.

In practice, relatively few law enforcement agencies participate in the NIBIN program in part due to the high cost, slow response, and inaccuracies of an IBIS system. In practice, the response time to queries for a match in the database is excessively long (e.g., days or weeks to receive results) and the matching results are often inaccurate, leading to wasted investigative effort. This has limited the effectivity of the NIBIN program.

Improvements to existing systems for imaging, analyzing, and comparing spent firearms cartridges for purposes of linking spent cartridges to particular firearms are desired.

SUMMARY

Methods and systems for collecting high definition images of spent firearm cartridges under different illumination conditions described herein. Features indicative of firing pin impact with each spent firearm cartridge are extracted and compared to features extracted from different spent firearm cartridges. The likelihood that the cartridges were fired from the same firearm is determined based on the differences between the extracted features.

A cartridge fixture locates a spent firearm cartridge inside an imaging chamber within a focus range of a ballistics imaging module. The ballistics imaging module includes a number of illumination devices located in different locations with respect to the spent firearm cartridge. In one aspect, the ballistics imaging module captures images of each spent firearms cartridge under different illumination scenarios.

Images captured by the ballistics imaging module are communicated to a ballistics server system, either directly, or indirectly, via a portable computing device. In a further aspect, the ballistics server system employs a trained image feature filter to extract features from the images collected at different illumination scenarios. The image features are indicative of the impact of the strike of the firing pin with the spent firearm cartridge. The trained feature filter is trained based on images of spent firearm cartridges having known features associated with firing pin impact with the spent firearm cartridges. The feature filter is trained to extract known features and reject noise features (e.g., scratches on the cartridge from handling or manufacturing that are not related to the firing of the cartridge by a particular firearm).

In another further aspect, the ballistics server compares the image features extracted from different spent firearm cartridges to determine the likelihood that the spent firearm cartridges were fired from the same firearm. In some examples, the ballistics server determines one or more error metrics that characterize the differences between features identified on a probe cartridge and a candidate cartridge. The value of the error metric or an aggregate error metric indicates the likelihood that the probe and candidate cartridges were fired from the same firearm.

In another further aspect, the ballistics server is configured to render detailed images of very similar features identified by the feature filter in more than one spent firearm cartridge. By displaying very similar features located in the same locations with respect to two different cartridges, the visual comparison between corresponding features of two different cartridges by a human user is simplified.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for collecting high definition images of spent firearm cartridges under different illumination conditions, extracting features indicative of firing pin impact with each spent firearm cartridge, and comparing extracted features between different spent firearm cartridges to determine the likelihood that the cartridges were fired from the same firearm are presented herein.

A cartridge fixture locates a spent firearm cartridge inside an imaging chamber within the focus range of a ballistics imaging module. The ballistics imaging module includes a number of illumination devices located in different locations with respect to the spent firearm cartridge. The ballistics imaging module captures images of the spent firearms cartridge under different illumination scenarios. Each different illumination scenario involves illuminating the spent firearms cartridge with a different combination of one or more illumination devices. Images captured by the ballistics imaging module are communicated to a ballistics server system, either directly, or indirectly, via a portable computing device. In some embodiments, the ballistics server identifies the region of interest of the spent cartridge where useful ballistics information is likely to be extracted. In some examples, the region of interest includes the entire base of the spent firearms cartridge, including the primer face. In some examples, the region of interest includes the area encompassing the primer face. In some embodiments, the portable computing device identifies the regions of interest and communicates the regions of interest to the ballistics server system. The ballistics server system determines image features from the region of interest in the images collected at different illumination scenarios. The image features are indicative of the impact of the strike of the firing pin with the spent firearm cartridge. The ballistics server compares the image features extracted from different spent firearm cartridges to determine the likelihood that the spent firearm cartridges were fired from the same firearm.

Figure 1:
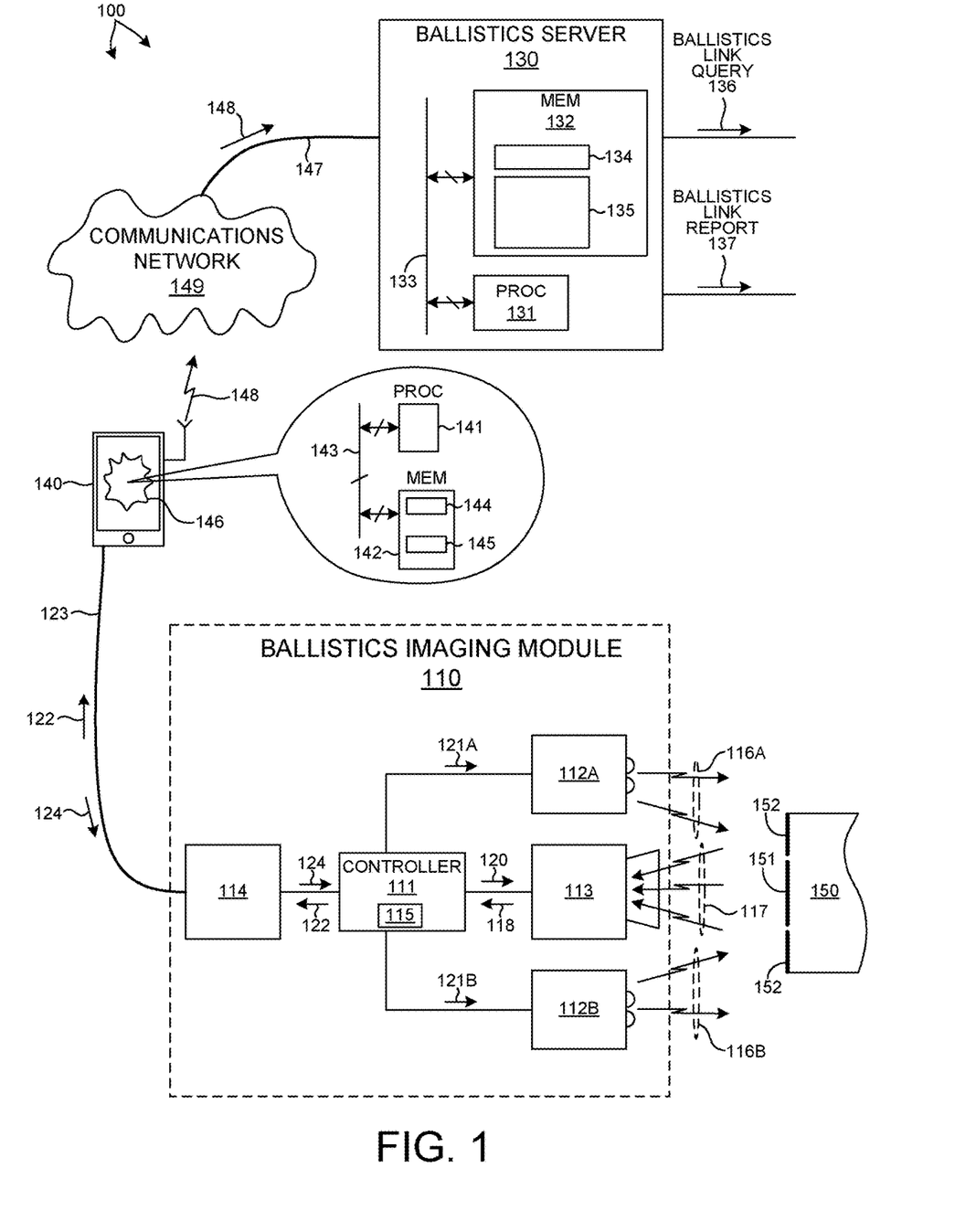
FIG. 1 is a simplified diagram illustrative of a ballistics imaging and analysis system 100 in one embodiment.

FIG. 1 is a diagram illustrative of a ballistics imaging and analysis system 100 including a ballistics imaging module 110 and a ballistics server system 130. Ballistics server system 130 stores a database 135 of ballistics records including images and one or more feature sets associated with each spent firearm cartridge imaged by one or more ballistics imaging modules (e.g., ballistics imaging module 101).

As depicted in FIG. 1, ballistics imaging module 110 includes an imaging device 113, an illuminator including illumination devices 112A and 112B, a controller 111, and a communications interface 114. As depicted in FIG. 1, controller 111 communicates control commands 121A-121B to illumination devices 112A-B, respectively. Illumination devices 112A-B emit illumination light 116A-B, respectively, in response to control commands 112A-B. By way of non-limiting example, illumination devices 112A-B may be light emitting diode (LED) based illumination devices, laser diode based illumination devices, incandescent illumination devices, or any other suitable illumination device. Illumination light 116A-B illuminates the base 152 and primer face 151 of spent firearm cartridge 150. In addition, controller 111 communicates control command 120 to imaging device 113 that causes imaging device 113 to collect light 117 and capture an image of cartridge base 152 and primer face 151 while illuminated by illumination light 116A-B.

In the embodiment depicted in FIG. 1, imaging device 113 includes a high definition camera (e.g., charge-coupled device, complementary metal oxide on silicon device, etc.) sensitive to visible light and generates high definition images of objects in its field of view from collected light 117. Signals 118 indicative of each captured image are communicated to controller 111 and buffered in memory 115. In some embodiments, imaging device 113 is sensitive to visible light and other wavelengths (e.g., infrared light, ultraviolet light, etc.) In some of these embodiments, an optical filter is located in the optical path between an image sensor of the imaging device and the surrounding environment. In some embodiments, the optical filter selectively passes light within specified bands and rejects light outside of the specified bands. In this manner, images are captured in different wavelength bands for feature analysis. In some embodiments, a zoom lens is located in the optical path between an image sensor of the imaging device and the surrounding environment. The zoom lens selectively adjusts the optical magnification of the captured images. In this manner, images are captured at different magnification for feature analysis.

In some embodiments, a ballistics imaging module is communicatively coupled to a portable computing device. In this manner, the ballistics imaging module may be brought into a field environment (e.g., a crime scene) to collect images of spent firearm cartridges, and the raw images uploaded to the portable computing device (e.g., portable computer, tablet, smartphone, etc.). The portable computing device is employed to control the ballistics imaging module, assemble ballistics information associated with each image, and upload the ballistics information to the ballistics server. In addition, the portable computing device may be employed to perform image processing tasks on the collected images before image upload.

In the embodiment depicted in FIG. 1, ballistics imaging module 110 is communicatively coupled to portable computing device 140 by a universal serial bus (USB) interface 123. Ballistics image information 122 is communicated from ballistics imaging module 110 to portable computing device 140 via USB interface 123. In addition, command signals 124 are communicated from portable computing system 140 to ballistics imaging module 110 via USB interface 123.

In one aspect, ballistics imaging module 110 captures images of cartridge base 152 and primer face 151 under more than one illumination scenario. In one embodiment, command signals 124 include commands that specify different illumination scenarios, which are executed by ballistics imaging module 110. Ballistics image information 122 includes at least one image associated with each illumination scenario.

In some embodiments, portable computing system 140 receives ballistics image information 122 and displays the captured images to a user. Based on viewing the images, the user may interact with a user interface of portable computing system 140 that causes portable computing system 140 to communicate control commands 124 to ballistics imaging module 110 that cause ballistics imaging module 111 to change illumination scenarios, illumination settings, image capture settings, zoom settings, focus plane settings, etc.

In some embodiments, portable computing system 140 is in communication with a geographic location system (e.g., a commercially available mapping application, global positioning system, mobile phone service network, etc.) to determine the physical location of each image capture and time of each image capture. Portable computing system 140 appends this information to the ballistics image information 122 and communicates the combined ballistics information 148 to ballistics server 130.

In some embodiments, a user interacts with a user interface of portable computing system 140 that causes portable computing system 140 to append ballistics information to ballistics image information 122. For example, a user may input information such as the caliber of the imaged cartridge, the type of firearm employed to fire the cartridge (e.g., handgun, rifle, etc.), the make, model, and serial number of the firearm employed to fire the cartridge, if known, any event specific information such as a case number, an estimate of the time and location of the shooting event, etc. Portable computing system 140 appends this ballistics information to ballistics image information 140 and communicates the combined ballistics information 148 to ballistics server 130.

In some embodiments, portable computing system 140 determines a region of interest within each ballistics image 122 captured by ballistics imaging module 110. In one example, portable computing system 140 determines a region of interest including the entire base of the spent firearms cartridge and excludes the portion of collected image outside of the base of the spent firearms cartridge. In this manner, the amount of memory required to store the image is reduced. In some other examples, the region of interest includes the area encompassing the primer face. In these examples, portable computing system 140 reduces ballistics image information 122 to capture only the region of interest and communicates the reduced image as part of combined ballistics information 148 to ballistics server 130.

Portable computing device 140 includes a processor 141 and memory 142 communicating over bus 143 to execute image processing, user interface, control, and communication functionality 146 as described herein. Memory 144 stores program code that, when executed by processor 141, causes processor 141 to implement data handling and memory management tasks, including any control, user interface, communication, and image processing tasks. In addition, memory 145 stores ballistics information 122 for image processing and communication tasks.

In the embodiment depicted in FIG. 1, portable computing system 140 is communicatively coupled to ballistics server 130 via a communications network 149 (e.g., a wireless communications network, Internet, a local area network (LAN), etc.). In general, portable computing system 140 may be communicatively coupled to ballistics server 130 via any suitable communications network, or combination of communications networks. For example, portable computing system 140 may be communicatively linked to the Internet via a wireless communication link adhering to the IEEE 802.11 protocol, Bluetooth protocol, or any other suitable wireless protocol, which, in turn, may be communicatively linked to ballistics server 103 by a wired communication link 147.

In some other embodiments, ballistics imaging module 110 is communicatively coupled to ballistics server 130 without an intervening portable communications device. In these embodiments, communications interface 114 is configured to communicate directly with ballistics server 130 via communications network 149.

Figure 2:
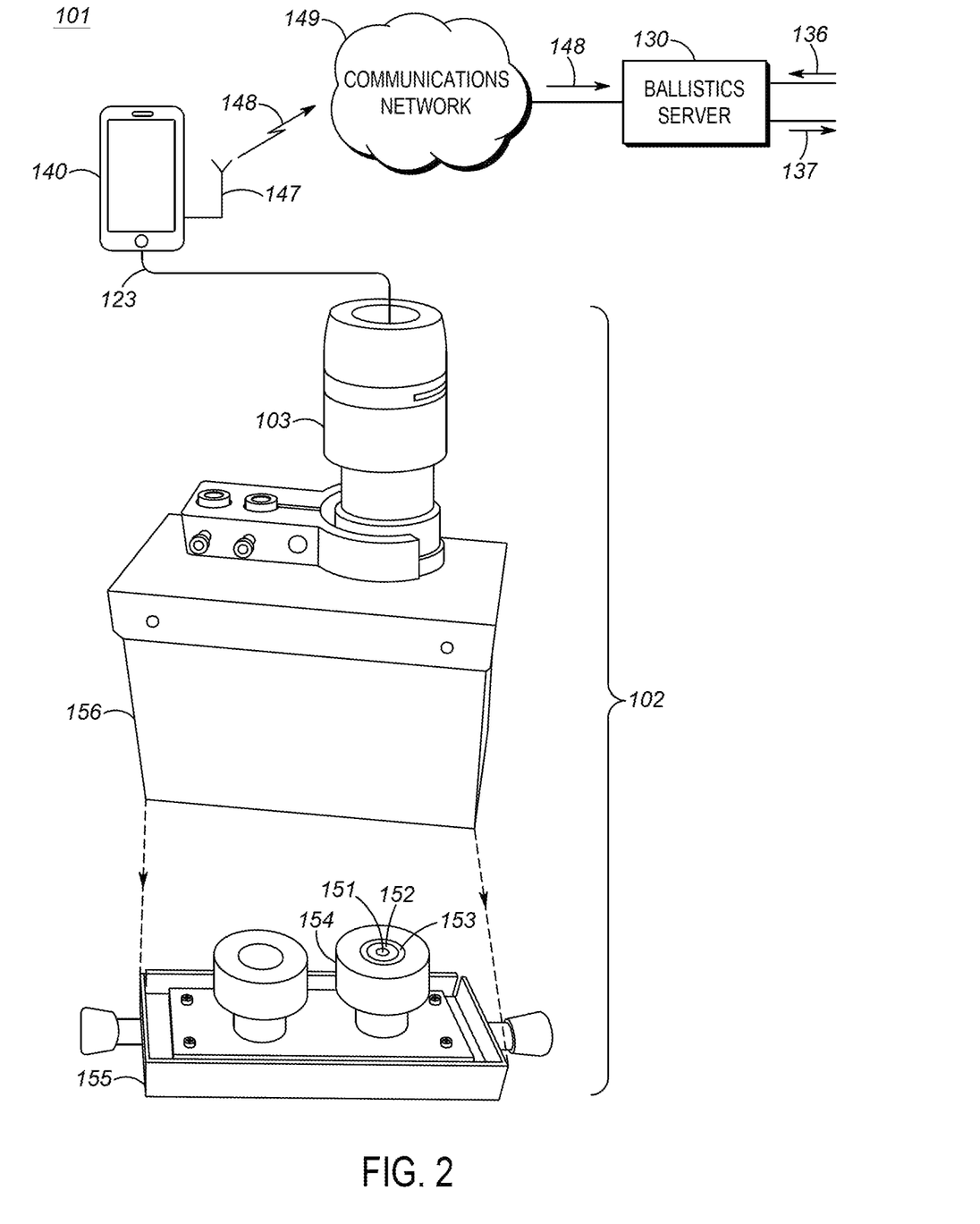
FIG. 2 is a simplified diagram illustrative of a ballistics imaging and analysis system 101 in another embodiment.

FIG. 2 depicts a ballistics imaging and analysis system 101 in another embodiment. Like numbered elements are analogous to corresponding elements described with reference to FIG. 1. As depicted in FIG. 2, ballistics imaging and analysis system includes a ballistics imaging device 102 including an imaging chamber fabricated in two separable parts 155 and 156 and a ballistics imaging module 103. In the embodiment depicted in FIG. 2, the ballistics imaging module 103 is a Dino-lite Edge digital microscope manufactured by AnMo Electronics Corporation (Taiwan). A cartridge fixture 154 is mounted to the bottom portion 155 of the imaging chamber. In the depicted embodiment, the cartridge fixture 154 includes a removable collet that locates the cartridge base 152 and primer face 151 within a focus range of the digital microscope when the bottom portion 155 is attached to the top portion 156 of the imaging chamber. When the bottom portion 155 is attached to the top portion of the imaging chamber 156, the imaging chamber envelopes the base of the spent firearm cartridge and blocks stray light from the surrounding environment from reaching the base of the spent firearm cartridge. In this manner, illumination provided by the ballistics imaging module 110 is the only illumination light that illuminates the spent firearm cartridge during imaging.

Figure 3:
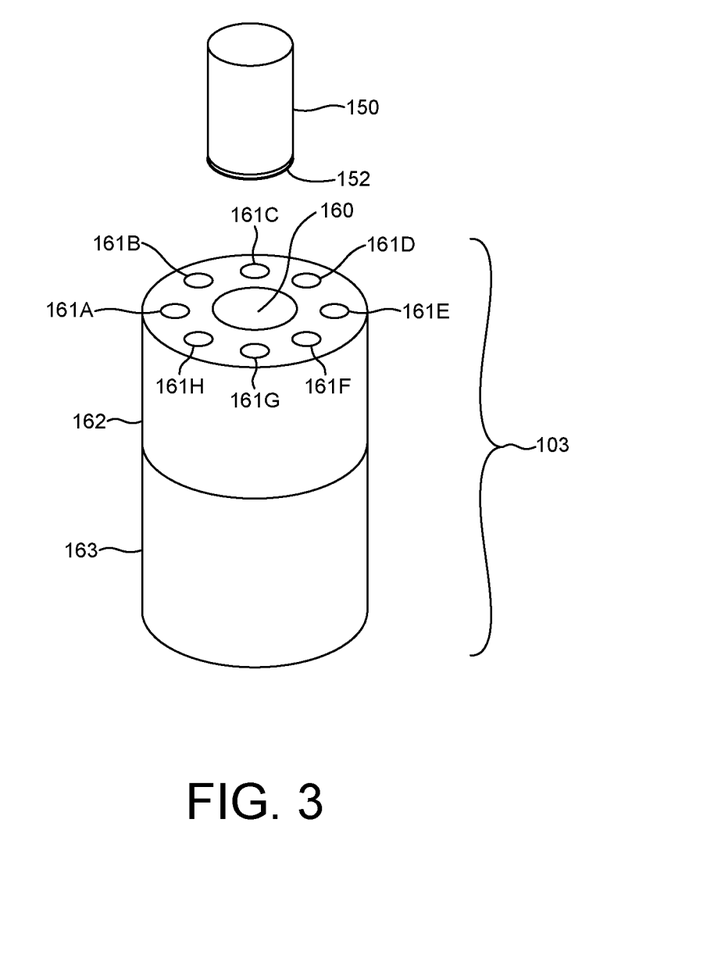
FIG. 3 depicts a simplified diagram illustrative of a ballistics imaging module 110 including a view of multiple illumination devices.

FIG. 3 depicts another illustration of ballistics imaging module 110 including a view of multiple illumination devices. As depicted in FIG. 3, the ballistics imaging module 110 includes eight different illumination devices 161A-H, an imaging aperture 160, optical magnification optics 162 and imaging sensor 163. As illustrated in FIG. 3, ballistics imaging module 110 includes several illumination devices located at different locations with respect to the base 152 of a spent firearm cartridge 150 being imaged. Different illumination scenarios are achieved by illuminating the spent firearms cartridge 150 with different combinations of illumination devices 161A-H. For example, in one illumination scenario, all of the illumination devices 161A-H illuminate cartridge 150. In another illumination scenario illumination devices 161A-D illuminate cartridge 150. In another illumination scenario illumination devices 161E-H illuminate cartridge 150. In another four illumination scenarios illumination devices 161A-B, 161C-D, 161E-F, and 161G-H, illuminate cartridge 150, respectively. In another eight illumination scenarios illumination devices 161A, 161B, 161C, 161D, 161E, 161F, 161G, and 161H, illuminate cartridge 150, respectively. In general, an illumination scenario involving any of illumination devices 161A-H alone or in any combination may be contemplated within the scope of this patent document.

As depicted in FIG. 1, ballistics server 130 includes a processor 131 and an amount of memory 132. Processor 131 and memory 132 may communicate over bus 133. Memory 132 includes an amount of memory 134 that stores a database program executable by processor 131. Exemplary, commercially available database programs include Oracle®, Microsoft SQL Server®, IBM DB2®, etc. Memory 132 also includes an amount of memory that stores a ballistics database memory 135 of ballistics images and ballistics information searchable by the database program executed by processor 131.

In some embodiments, ballistics server 130 determines a region of interest within each ballistics image captured by ballistics imaging module 110. In one example, ballistics server 130 determines a region of interest including the entire base of the spent firearms cartridge and excludes the portion of collected image outside of the base of the spent firearms cartridge. In this manner, the amount of memory required to store the image is reduced. In some other examples, the region of interest includes the area encompassing the primer face. In these examples, ballistics server 130 reduces the image size to the region of interest and stores the reduced image in memory 135.

In a further aspect, ballistics server 130 determines image features from the region of interest of each of the images of a spent firearm cartridge collected at different illumination scenarios. The image features are indicative of the impact of the strike of the firing pin with the spent firearm cartridge. More specifically, ballistics server 130 assembles a vector of image features extracted from more than one image of the region of interest of a particular spent firearm cartridge. In this manner, features indicative of the strike of the firing pin that are visible under some illumination scenarios, but not others, are successfully extracted and assembled into one feature vector.

In some examples, ballistics server 130 employs a trained feature filter to the each captured image data set to determine the features indicative of the impact of the strike of the firing pin with the spent firearm cartridge. In some examples, the trained feature filter is a neural network model. In some other examples, the trained feature filter is a support vector machine. In general, any suitable trained feature filter may be contemplated within the scope of this patent document.

In a further aspect, the trained feature filter is trained based on images of spent firearm cartridges having known features associated with firing pin impact with the spent firearm cartridges. The feature filter is trained to extract known features and reject noise features (e.g., scratches on the cartridge from handling or manufacturing that are not related to the firing of the cartridge by a particular firearm).

Figure 4:
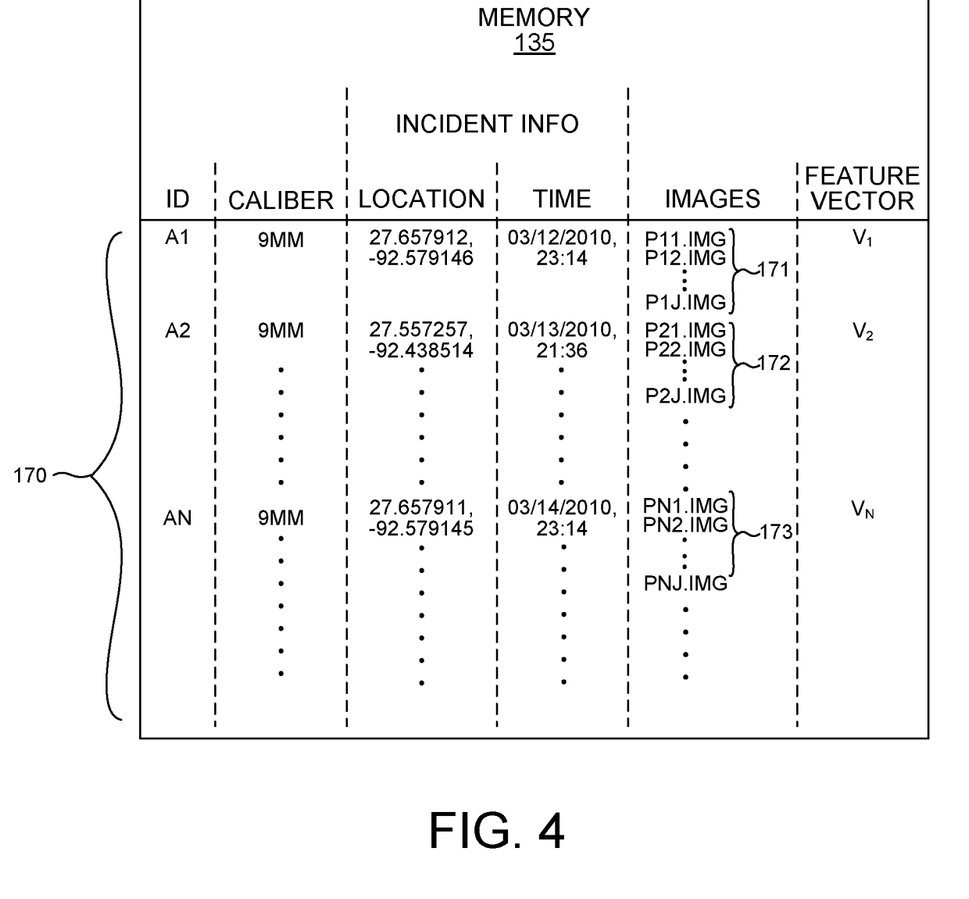
FIG. 4 depicts a simplified illustration of a plurality of ballistics records 170 stored in memory 135.

By way of non-limiting example, FIG. 4 is illustrative of a plurality of ballistics records 170 stored in memory 135. In the depicted example, a ballistics record includes an index identifier, the caliber of the imaged cartridge, the estimated location and time of firing of the cartridge, the ballistics images associated with the spent firearm cartridge captured by a ballistics imaging module, and the feature vector, V, including the features extracted from the captured images. The index identifier is assigned to the particular spent firearms cartridge. The index identifier, caliber, incident location and time, etc., are useful to facilitate sorting and organizing the ballistics records. The information included in each ballistics record illustrated in FIG. 4 is provided by way on non-limiting example. Other information such as the name of the operator of the ballistics imaging module who scanned the images, the type of firearm employed to fire the cartridge (e.g., handgun, rifle, etc.), the make, model, and serial number of the firearm employed to fire the cartridge, if known, any event specific information such as a case number, etc.

By way of non-limiting example, ballistics server 130 is operable to communicate with an external computing system (not shown) over a communications link. In one example, an external computing system communicates a ballistics link query 136 to ballistics server 130. The ballistics link query 136 requests a ballistics link report 137 associated with a particular spent firearms cartridge. In response, ballistics server 130 communicates a ballistics link report 137 associated with the particular spent firearms cartridge to the external computing system.

Figure 5:
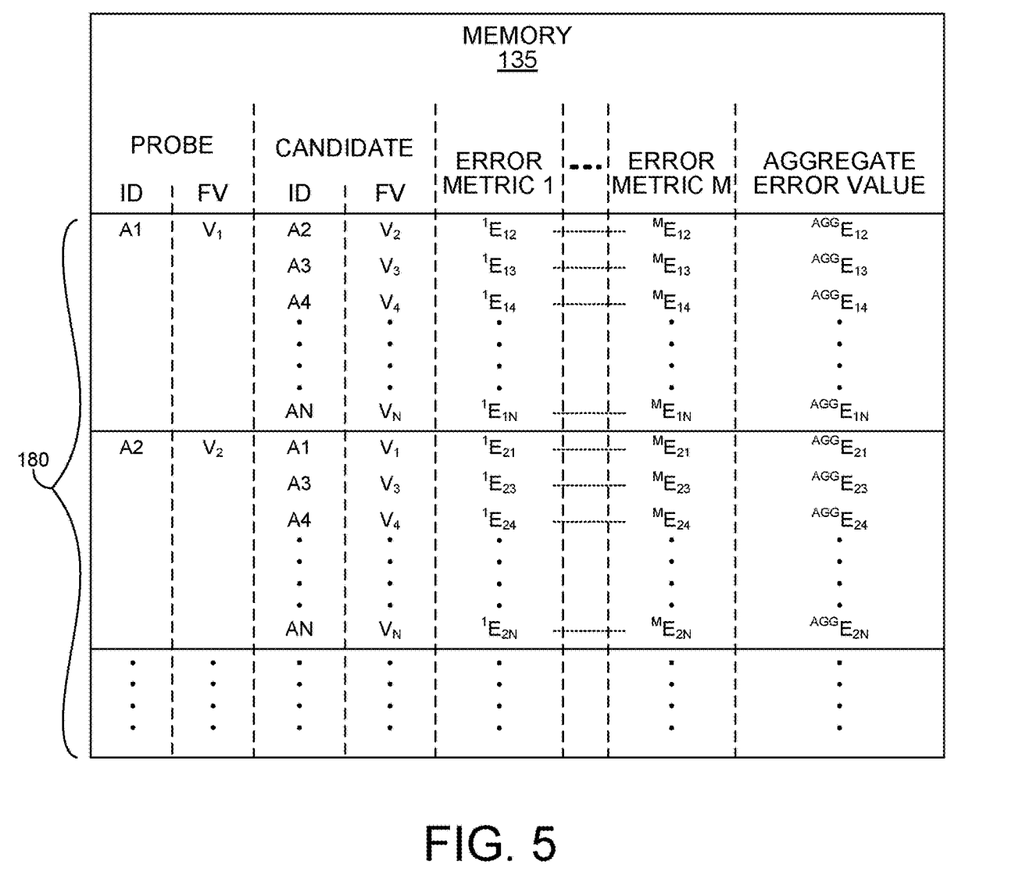
FIG. 5 depicts a simplified illustration of a plurality of comparisons between different spent firearm cartridges.

In a further aspect, ballistics server 130 compares the image features extracted from different spent firearm cartridges to determine the likelihood that the spent firearm cartridges were fired from the same firearm. FIG. 5 illustrates a plurality of comparisons 180 between different spent firearm cartridges. As depicted in FIG. 5, each comparison includes a probe cartridge and a candidate cartridge. For example, the first comparison illustrates spent firearm cartridge A1 as the probe cartridge and spent firearm cartridge A2 as the candidate cartridge. A1 is characterized by feature vector, $V_1$, and A2 is characterized by feature vector, $V_2$. Ballistics server 130 determines an error metric that characterizes a difference between $V_1$ and $V_2$. Exemplary error metrics include least squared error value, mean absolute error, etc. In the depicted example, ballistics server 130 determines multiple different error metrics ($^1E_{12}$, $^2E_{12}$, ... $^ME_{12}$). In this example, ballistics server 130 determines an aggregate error value, $^{AGG}E_{12}$, based on a weighted sum of the individual error metrics. In these examples, the value of the aggregate error metric indicates the likelihood that the probe and candidate cartridges were fired from the same firearm. In some examples, ballistics server 130 determines one error metric. In these examples, the value of the error metric indicates the likelihood that the probe and candidate cartridges were fired from the same firearm.

In some examples, ballistics server 130 determines a difference between the aggregate error value and a predetermined threshold value. The difference between the aggregate value and the predetermined threshold value is indicative of the likelihood that the probe cartridge and the candidate cartridge were fired from the same firearm.

In some examples, ballistics link report 137 includes a probe cartridge and a list of candidate cartridges and associated aggregate error values ranked in order of increasing aggregate error values. In this manner, candidate cartridges with the smallest aggregate error values with respect to the probe cartridge are listed first.

Figure 6:
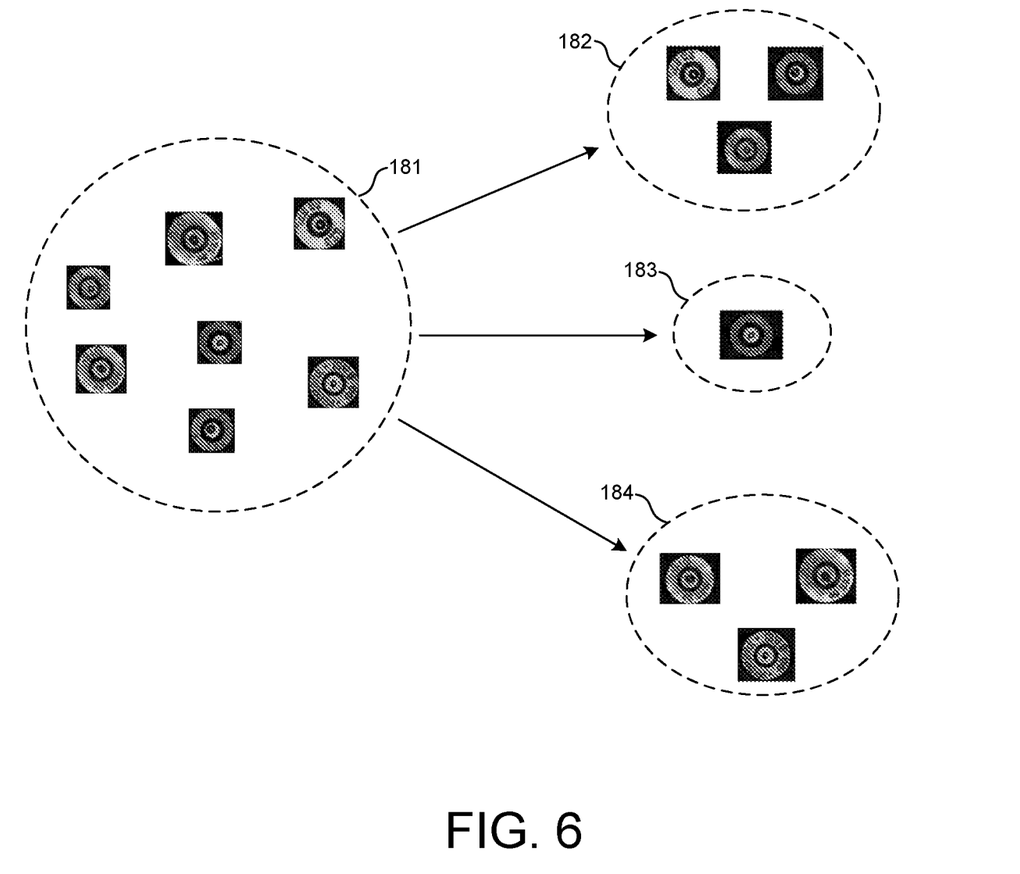
FIG. 6 depicts a simplified illustration of a group of seven different cartridges found at the same crime scene.

As depicted in FIG. 5, cartridge A1 is compared to different cartridges, A2-AN. Similarly, cartridge A2 is compared to different cartridges, A1 and A3-AN. In some examples, cartridges A1-AN are found at the same crime scene and are compared to one another to determine groups of cartridges that were fired from the same firearm. For example, FIG. 6 depicts a group 181 of seven different cartridges found at the same crime scene. By comparing each cartridge with each of the other cartridges, ballistics server 130 determines a group 182 of three of the seven cartridges were fired from one firearm, a group 183 of one cartridge fired from a second firearm, and a group 184 of three cartridges fired from a third firearm.

In another further aspect, ballistics server 130 is configured to render detailed images of similar features identified by the feature filter in more than one spent firearm cartridge.

Figure 7A:
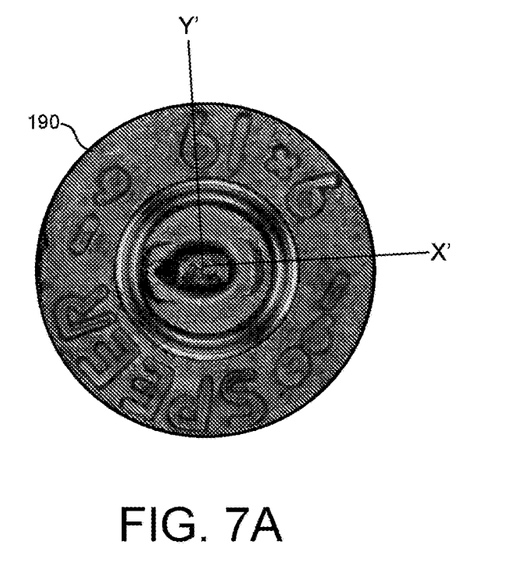
FIGS. 7A-7B depict images of a probe cartridge 190 and a candidate cartridge 191, respectively.
Figure 7B:
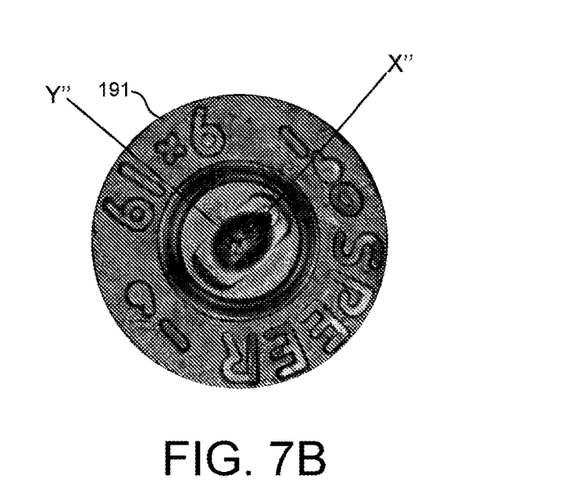

In one example, ballistics server 130 determines an orientation of a firing pin strike with respect to a probe cartridge and an orientation of a firing pin strike with respect to a candidate cartridge. In addition, ballistics server 130 renders an image including the probe and candidate cartridges such that the firing pin strikes of the probe and candidate cartridges are aligned. FIGS. 7A-7B depict images of a probe cartridge 190 and a candidate cartridge 191, respectively. As illustrated in FIG. 7A, the X' axis of the X'Y' coordinate frame is aligned with the elongated direction of the firing pin strike on the primer face of probe cartridge 190. Similarly, as illustrated in FIG. 7B, the X" axis of the X"Y" coordinate frame is aligned with the elongated direction of the firing pin strike on the primer face of candidate cartridge 191.

Figure 8A:
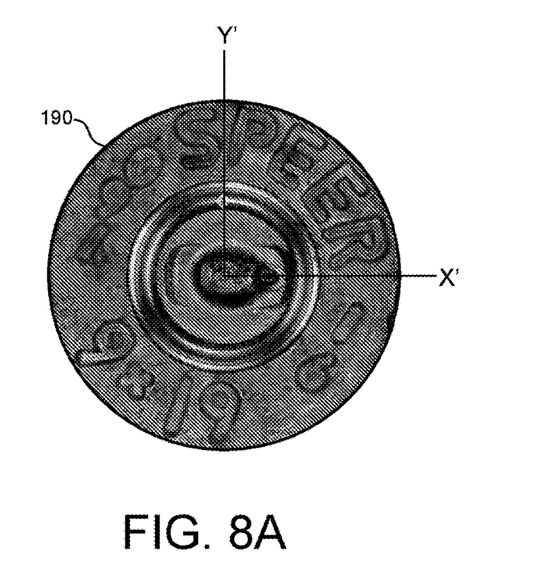
FIGS. 8A-8B depict rotated images of probe cartridge 190 and candidate cartridge 191, respectively.
Figure 8B:
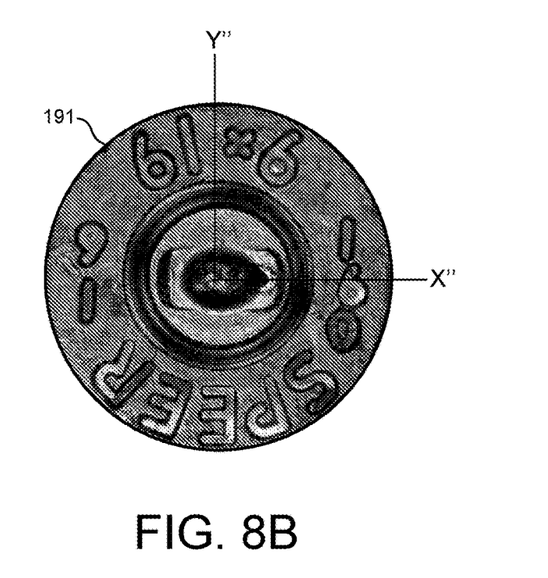

FIGS. 8A-8B depict rotated images of probe cartridge 190 and candidate cartridge 191, respectively. As illustrated in FIG. 8A and FIG. 8B, the images of probe cartridge 190 and candidate cartridge 191 are rotated such that the X' axis of the X'Y' coordinate frame is aligned with the X" axis of the X"Y" coordinate frame. In this manner, ballistics server 130 renders a side-by-side view of probe cartridge 190 and candidate cartridge 191 such that the direction of the firing pin strike to both cartridges is aligned. This simplifies visual comparison between firing pin strikes associated with both cartridges by a human user.

Figure 9A:
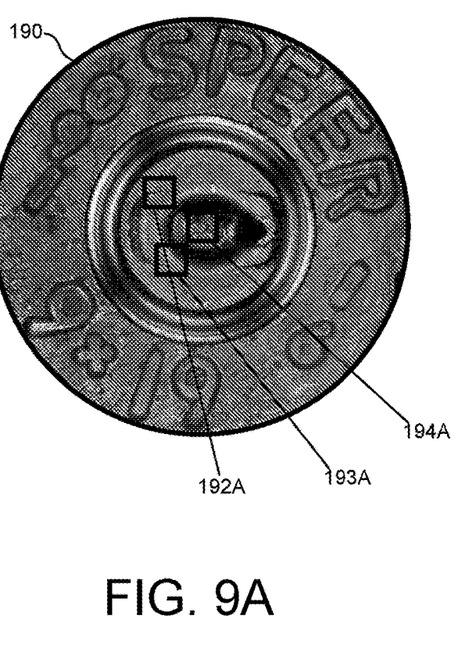
FIGS. 9A-9B depict images of probe cartridge 190 and candidate cartridge 191 including three locations in each image where very similar features are located.
Figure 9B:
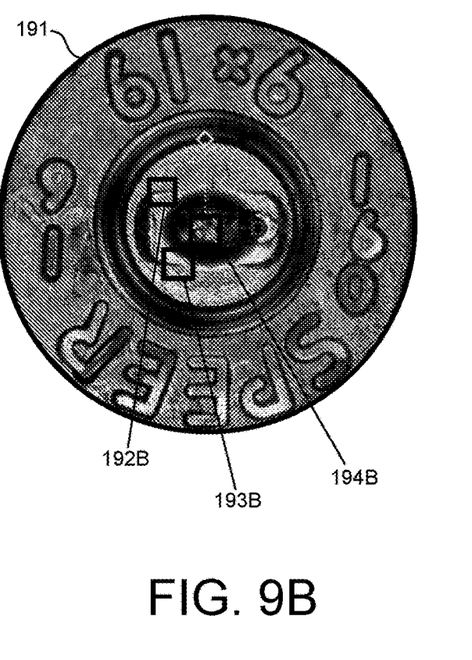

In another further aspect, ballistics server 130 identifies one or more locations in the aligned images of both probe cartridge 190 and candidate cartridge 191 where features having very similar characteristics are located. FIGS. 9A-9B depict images of probe cartridge 190 and candidate cartridge 191 including three locations in each image where very similar features are located. As depicted in FIG. 9A, ballistics server 130 identifies three locations 192A, 193A, and 194A. At each location ballistics server 130 has identified one of more features that are also found in the same locations with respect to candidate cartridge 191. In other words, locations 192B, 193B, and 194B are located in the same location with respect to candidate cartridge 191 as locations 192A, 193A, and 194A with respect to probe cartridge 190. Moreover, ballistics server 130 identifies one or more features at locations 192A, 193A, and 194A and corresponding features at locations 192B, 193B, and 194B that are very similar. In one example, each feature is described by one or elements of the feature vector associated with each cartridge. Moreover, the differences between the one or more elements describing very similar features in the probe image and the candidate image are less than a predetermined threshold value.

Figure 10A:
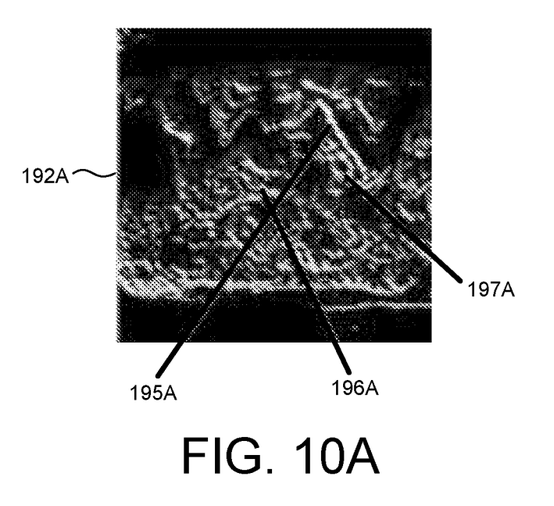
FIGS. 10A-10B depict images of probe cartridge 190 and candidate cartridge 191, respectively, at one location including three very similar features.
Figure 10B:
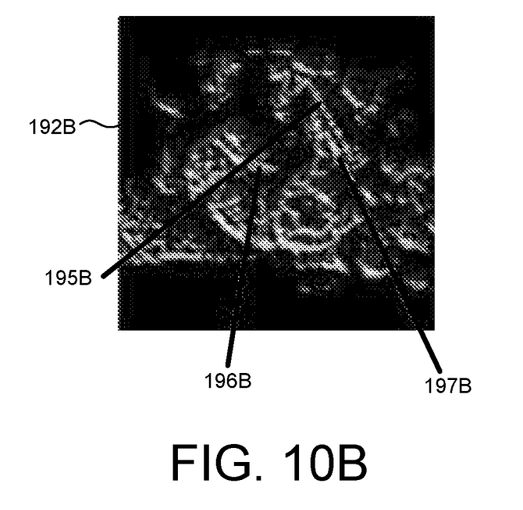

In another further aspect, ballistics server 130 renders a detailed image including a location of the probe cartridge and corresponding location of the candidate cartridge where one or more very similar features are located. FIG. 10A depicts an image of location 192A of the probe cartridge including three features 195A, 196A, and 197A. Similarly, FIG. 10B depicts an image of location 192B including three features 195B, 196B, and 197B that are very similar to features 195A, 196A, and 197A. By displaying very similar features located in the same locations with respect to two different cartridges, the visual comparison between corresponding features of two different cartridges by a human user is simplified.

In another further aspect, ballistics system 130 is configured to filter the rendered images to enhance the visibility of the feature to the human user. In one example, ballistics system 130 may enhance contrast or employ images collected with particular illumination scenarios that enhance the visibility of the identified features.

Figure 11:
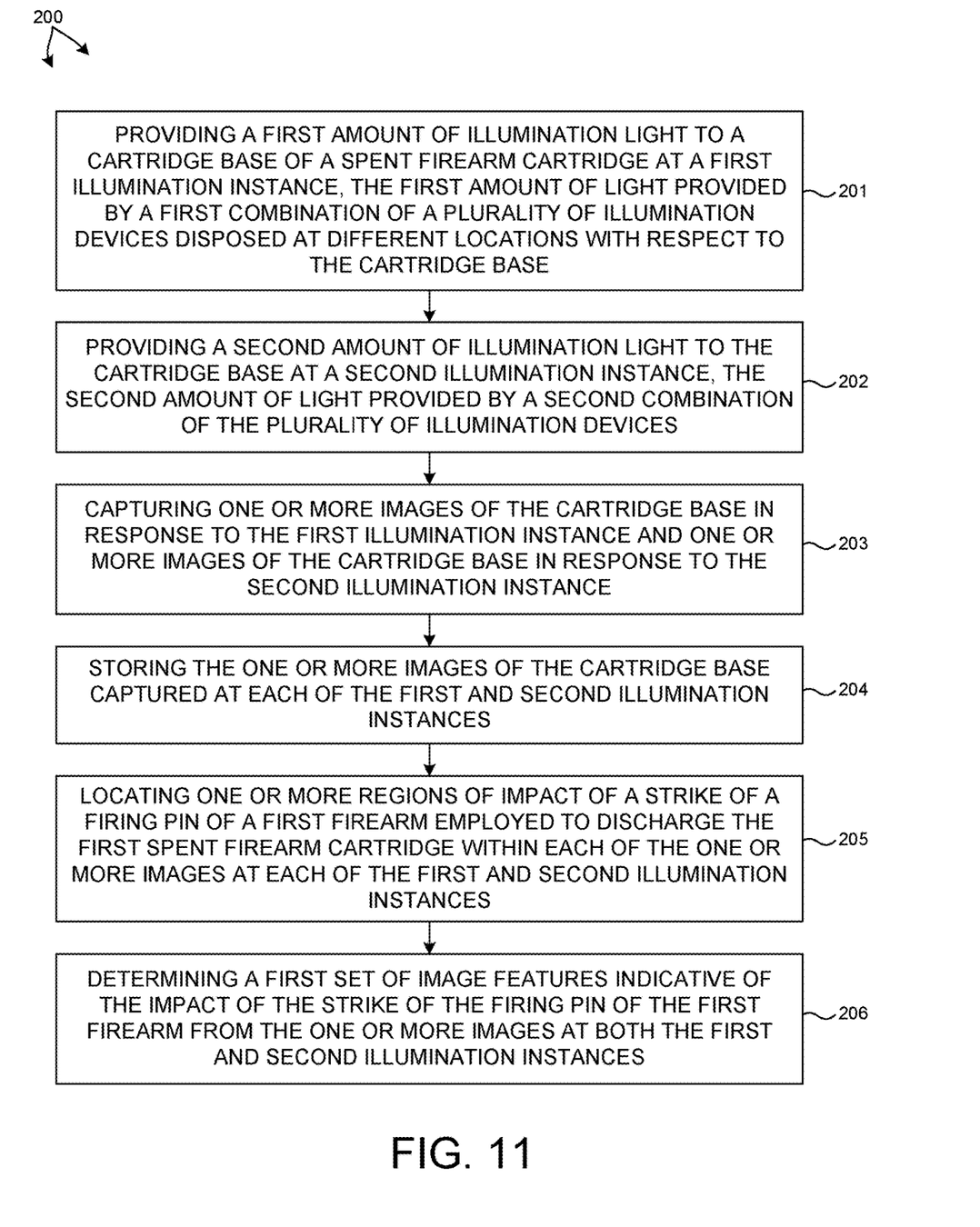
FIG. 11 is a flowchart illustrative of a method 200 for collecting and analyzing images of spent firearms cartridges.

FIG. 11 illustrates a method 200 for collecting and analyzing images of spent firearms cartridges. Method 200 is suitable for implementation by a ballistics imaging and analysis system such as ballistics imaging and analysis system 100 illustrated in FIG. 1 of the present invention. In one aspect, it is recognized that data processing blocks of method 200 may be carried out via a pre-programmed algorithm executed by one or more processors of ballistics imaging and analysis system 100, or any other general purpose computing system. It is recognized herein that the particular structural aspects of ballistics imaging and analysis system 100 do not represent limitations and should be interpreted as illustrative only.

In block 201, a first amount of illumination light is provided to a cartridge base of a spent firearm cartridge at a first illumination instance. The first amount of light is provided by a first combination of illumination devices disposed at different locations with respect to the cartridge base.

In block 202, a second amount of illumination light is provided to the cartridge base at a second illumination instance. The second amount of light is provided by a second combination of the illumination devices disposed at different locations with respect to the cartridge base.

In block 203, one or more images of the cartridge base are captured in response to the first illumination instance and one or more images of the cartridge base are captured in response to the second illumination instance.

In block 204, the one or more images of the cartridge base captured at each of the first and second illumination instances are stored in a memory.

In block 205, one or more regions of impact of a strike of a firing pin of a first firearm employed to discharge the first spent firearm cartridge are located within each of the one or more images at each of the first and second illumination instances.

In block 206, a first set of image features indicative of the impact of the strike of the firing pin of the first firearm is determined from the one or more images at both the first and second illumination instances.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A ballistics imaging and analysis system comprising:
   an illuminator including a plurality of illumination devices disposed at different locations with respect to a cartridge base of a first spent firearm cartridge, the illuminator providing a first amount of illumination light to the cartridge base at a first illumination instance and a second amount of illumination light to the cartridge base at a second illumination instance, wherein the first amount of light is provided by a first combination of the plurality of illumination devices, and wherein the second amount of light is provided by a second combination of the plurality illumination devices; and
   an imaging device including a visible light sensor configured to capture one or more images of the cartridge base in response to the first illumination instance and one or more images of the cartridge base in response to the second illumination instance.

2. The ballistics imaging and analysis system of claim 1 further comprising:
   a computing system configured to:
      store the one or more images of the cartridge base captured by the imaging device at each of the first and second illumination instances;
      locate one or more regions of impact of a strike of a firing pin of a first firearm employed to discharge the first spent firearm cartridge within each of the one or more images at each of the first and second illumination instances; and
      determine a first set of image features indicative of the impact of the strike of the firing pin of the first firearm from the one or more images at both the first and second illumination instances.

3. The ballistics imaging and analysis system of claim 2, wherein the computing system is further configured to:
   determine values of one or more error metrics associated with a difference between the first set of image features and a second set of image features associated with a strike of a firing pin of a second firearm employed to discharge a second spent firearm cartridge.

4. The ballistics imaging and analysis system of claim 3, wherein the computing system is further configured to:
   determine an aggregate value associated with the values of the one or more error metrics; and
   determine a difference between the aggregate value and a predetermined threshold value, wherein the difference between the aggregate value and the predetermined threshold value is indicative of a likelihood that the first firearm and the second firearm are the same firearm.

5. The ballistics imaging and analysis system of claim 2, wherein the determining of the first set of image features involves a trained feature filter.

6. The ballistics imaging and analysis system of claim 5, wherein the trained feature filter is any of a neural network and a support vector machine.

7. The ballistics imaging and analysis system of claim 5, wherein the computing system is further configured to:
   train the feature filter on images of a plurality of spent firearm cartridges having known features associated with firing pin impact with the plurality of spent firearm cartridges.

8. The ballistics imaging and analysis system of claim 4, wherein the first and second spent firearm cartridges are from the same crime scene.

9. The ballistics imaging and analysis system of claim 3, the computing system further configured to:
   determine an orientation of the strike of the firing pin with respect to the first spent firearm cartridge and an orientation of the strike of the firing pin with respect to the second spent firearm cartridge;
   render an image including an image of the first spent firearm cartridge and an image of the second spent firearm cartridge on a display visible to a user, wherein the strike of the firing pin with respect to the first spent firearm cartridge is aligned with the strike of the firing pin with respect to the second spent firearm cartridge;
   determine a feature located in the same location with respect to both the image of the first spent firearm cartridge and the image of the second spent firearm cartridge; and
   render an image on the display visible to the user including the feature located in the image of the first spent firearm cartridge and the feature located in the image of the second firearm cartridge.

10. The ballistics imaging and analysis system of claim 9, the computing system further configured to:
    filter the image of the feature located in the image of the first spent firearm cartridge and the image of the feature located in the image of the second spent firearm cartridge to enhance visibility of the feature to the user.

11. A method comprising:
    providing a first amount of illumination light to a cartridge base of a first spent firearm cartridge at a first illumination instance, the first amount of light provided by a first combination of a plurality of illumination devices disposed at different locations with respect to the cartridge base;

providing a second amount of illumination light to the cartridge base at a second illumination instance, the second amount of light provided by a second combination of the plurality of illumination devices;

capturing one or more images of the cartridge base in response to the first illumination instance and one or more images of the cartridge base in response to the second illumination instance; and storing the one or more images of the cartridge base captured at each of the first and second illumination instances.

12. The method of claim 11, further comprising:

locating one or more regions of impact of a strike of a firing pin of a first firearm employed to discharge the first spent firearm cartridge within each of the one or more images at each of the first and second illumination instances;

determining a first set of image features indicative of the impact of the strike of the firing pin of the first firearm from the one or more images at both the first and second illumination instances; and determining values of one or more error metrics associated with a difference between the first set of image features and a second set of image features associated with a strike of a firing pin of a second firearm employed to discharge a second spent firearm cartridge.

13. The method of claim 12, further comprising:

determining an aggregate value associated with the values of the one or more error metrics; and determining a difference between the aggregate value and a predetermined threshold value, wherein the difference between the aggregate value and the predetermined threshold value is indicative of a likelihood that the first firearm and the second firearm are the same firearm.

14. The method of claim 12, wherein the determining of the first set of image features involves a trained feature filter.

15. The method of claim 14, further comprising:

training the feature filter on images of a plurality of spent firearm cartridges having known features associated with firing pin impact with the spent firearm cartridges.

16. The method of claim 13, wherein the first and second spent firearm cartridges are from the same crime scene.

17. The method of claim 12, further comprising:

determining an orientation of the strike of the firing pin with respect to the first spent firearm cartridge and an orientation of the strike of the firing pin with respect to the second spent firearm cartridge;

rendering an image including an image of the first spent firearm cartridge and an image of the second spent firearm cartridge on a display visible to a user, wherein the strike of the firing pin with respect to the first spent firearm cartridge is aligned with the strike of the firing pin with respect to the second spent firearm cartridge;

determining a feature located in the same location with respect to both the image of the first spent firearm cartridge and the image of the second spent firearm cartridge; and rendering an image on the display visible to the user including the feature located in the image of the first spent firearm cartridge and the feature located in the image of the second firearm cartridge.

18. The method of claim 17, further comprising:

filtering the image of the feature located in the image of the first spent firearm cartridge and the image of the feature located in the image of the second spent firearm cartridge to enhance visibility of the feature to the user.

19. A ballistics imaging and analysis system comprising:

an illuminator including a plurality of illumination devices disposed at different locations with respect to a cartridge base of a first spent firearm cartridge, the illuminator providing a first amount of illumination light to the cartridge base at a first illumination instance and a second amount of illumination light to the cartridge base at a second illumination instance, wherein the first amount of light is provided by a first combination of the plurality of illumination devices, and wherein the second amount of light is provided by a second combination of the plurality illumination devices;

an imaging device including a visible light sensor configured to capture one or more images of the cartridge base in response to the first illumination instance and one or more images of the cartridge base in response to the second illumination instance; and a computer system comprising:

one or more processors; and an amount of memory storing an amount of program code that when executed by the one or more processors causes the one or more processors to:

store the one or more images of the cartridge base captured by the imaging device at each of the first and second illumination instances;

locate one or more regions of impact of a strike of a firing pin of a first firearm employed to discharge the first spent firearm cartridge within each of the one or more images at each of the first and second illumination instances; and determine a first set of image features indicative of the impact of the strike of the firing pin of the first firearm from the one or more images at both the first and second illumination instances.

20. The ballistics imaging and analysis system of claim 19, the amount of memory further storing an amount of program code that when executed by the one or more processors causes the one or more processors to:

determine values of one or more error metrics associated with a difference between the first set of image features and a second set of image features associated with a strike of a firing pin of a second firearm employed to discharge a second spent firearm cartridge, wherein the values of the one or more error metrics are indicative of a likelihood that the first firearm and the second firearm are the same firearm.

* * * * *